United States Patent
Sinsel et al.

(10) Patent No.: US 7,101,454 B2
(45) Date of Patent: *Sep. 5, 2006

(54) SURFACE PREPARATION AND POLYMERIC COATING OF CONTINUOUS-STRIP FLAT-ROLLED STEEL AND COATED PRODUCT

(75) Inventors: John A. Sinsel, Weirton, WV (US); Mark V. Loen, Steubenville, OH (US); Michael S. Bailey, Landenberg, PA (US)

(73) Assignee: ISG Technologies, Inc., Bethlehem, PA (US)

( * ) Notice: Subject to any disclaimer, the term of this patent is extended or adjusted under 35 U.S.C. 154(b) by 208 days.

This patent is subject to a terminal disclaimer.

(21) Appl. No.: 10/367,371

(22) Filed: Feb. 14, 2003
(Under 37 CFR 1.47)

(65) Prior Publication Data
US 2003/0152789 A1 Aug. 14, 2003

Related U.S. Application Data

(63) Continuation-in-part of application No. 10/156,471, filed on May 28, 2002, which is a continuation-in-part of application No. 09/490,305, filed on Jan. 24, 2000, now abandoned.

(60) Provisional application No. 60/357,218, filed on Feb. 15, 2002.

(51) Int. Cl.
*B32B 15/08* (2006.01)
*B29C 47/02* (2006.01)

(52) U.S. Cl. .............. 156/244.11; 156/244.18; 156/244; 156/19; 264/171.14; 264/171.21

(58) Field of Classification Search ........... 156/244.11, 156/244.19, 244.18
See application file for complete search history.

(56) References Cited

U.S. PATENT DOCUMENTS

| | | | | |
|---|---|---|---|---|
| 4,941,935 A | * | 7/1990 | Gregory | 156/243 |
| 5,919,517 A | * | 7/1999 | Levendusky et al. | 427/211 |
| 6,143,825 A | | 11/2000 | Beren et al. | |
| 6,773,217 B1 | * | 8/2004 | Sinsel et al. | 413/1 |
| 2003/0152788 A1 | * | 8/2003 | Velliky | 428/461 |

* cited by examiner

*Primary Examiner*—Monique R. Jackson
(74) *Attorney, Agent, or Firm*—Berenato, White & Stavish, LLC

(57) ABSTRACT

Engineered composite coated flat-rolled steel strip is produced in continuous line operations, in which flat-rolled steel strip, free of surface iron oxide, having a metallic corrosion-protective coating, is polymer coated in continuous-line operations in which a plurality of adherent thin-film layers of polymeric material are deposited on a strip surface. In a dual-surface polymeric coating embodiment, each surface is separately-pretreated for surface adhesion, solidified, and polymeric overhang is removed. Finish processing re-melts the polymer coating and rapidly cools that coating through glass-transition temperature to establish amorphous characteristics in the polymeric coating materials. An anhydride-modified polypropylene, first contacts the strip, an intermediate layer can include about fifteen to twenty five percent, by weight, polybutylene with the balance polypropylene; an outer surface polymeric layer includes about five to ten percent, by weight, polybutylene with the balance polypropylene.

19 Claims, 5 Drawing Sheets

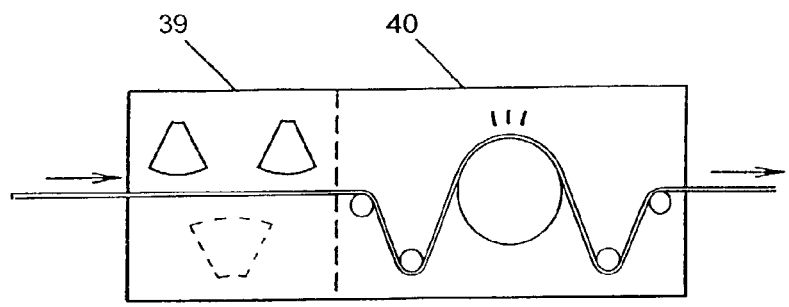
FIG. 2
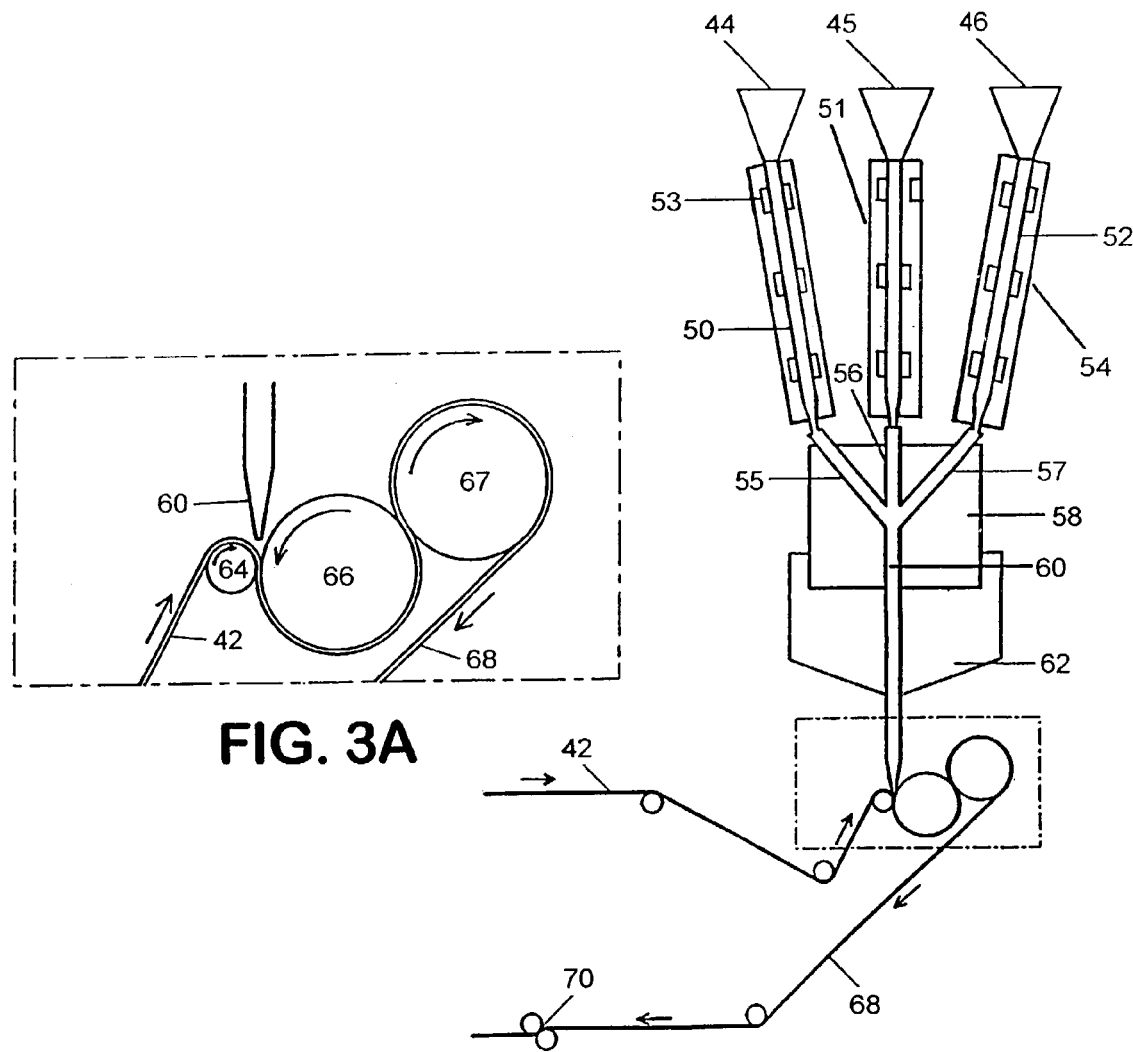
FIG. 3A
FIG. 3

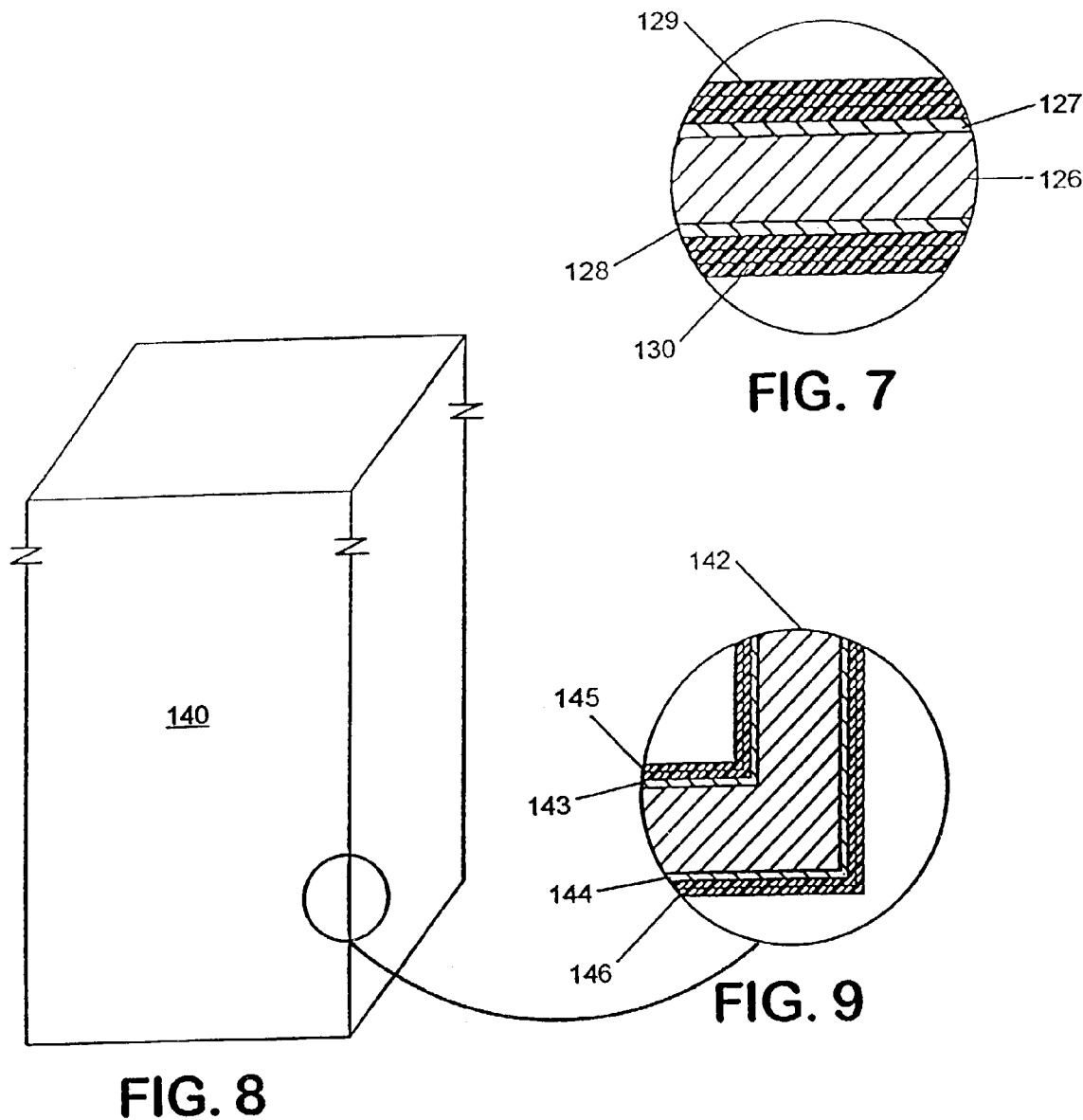

SURFACE PREPARATION AND POLYMERIC COATING OF CONTINUOUS-STRIP FLAT-ROLLED STEEL AND COATED PRODUCT

RELATED APPLICATIONS

This application claims the benefit of U.S. Provisional Patent Application Ser. No. 60/357,218 filed Feb. 15, 2002; and, is a continuation-in-part of co-owned and co-pending U.S. patent application Ser. No. 10/156,471 entitled "METHODS AND APPARATUS FOR SURFACE PREPARATION AND DUAL POLYMERIC LAYER COATING OF CONTINUOUS-STRIP FLAT-ROLLED SHEET METAL, AND, COATED PRODUCT" filed May 28, 2002 as a continuation-in-part of co-owned U.S. patent application Ser. No. 09/490,305 filed Jan. 24, 2000, now abandoned entitled "Polymeric Coated Metal Strip and Method for Processing Same".

INTRODUCTION

This invention relates to composite-coating of continuous-strip flat-rolled steel including activating a single substrate surface at-a-time to enhance polymeric adhesion and facilitate continuous-line polymeric coating operations. More particularly, this invention is concerned with simultaneous extrusion deposition of selected multiple polymeric materials and providing for uniform thickness polymeric coating of engineered composite-coated work-product.

OBJECTS OF THE INVENTION

An important object involves selecting multiple thermoplastic polymers for providing surface toughness while maintaining surface flexibility of polymeric-coated rigid flat-rolled steel.

A related object combines composite-coating of rigid flat-rolled steel substrate for increasing fabricating capabilities for, and durability of, market-usage fabricated product.

A more specific object provides for extrusion of multiple molten polymeric coating materials for coating continuous-strip steel, free of strip heating requirements, while traveling in a continuous-line.

A further object provides surface activation of metallic corrosion-protected continuous-strip steel substrate for bonding polymeric coating materials during continuous-line manufacture of engineered composite-coated work-product.

Other objects, advantages, and contributions are set forth in disclosing embodiments of the invention shown in the accompanying drawings.

BRIEF DESCRIPTION OF THE FIGURES

FIG. 2 is an enlarged schematic cross-sectional view of surface pre-treatment apparatus for describing surface-activating methods and apparatus of the invention for enhancing polymeric adhesion;

FIG. 3 is a schematic perspective view, partially in cross-section, for describing supply and preparation of selected thermoplastic polymeric coating materials for extrusion in accordance with the invention;

FIG. 3A is an enlarged schematic cross-sectional view, of a designated portion of FIG. 3, for describing principles of the invention for melted extrusion deposition of multiple polymeric materials during in-line travel of continuous-strip;

FIG. 7 is an enlarged cross-sectional view of engineered composite-coated work-product of the invention for describing metallic sub-surface protection and dual-surface polymeric coating produced by utilizing the embodiment of FIG. 6;

FIG. 8 is a schematic-perspective view for describing types and advantages of polymeric-coated building-construction structures as fabricated from engineered composite-coated work-product of the invention, and FIG. 9 is an enlarged cross-sectional view of a designated portion of FIG. 8 for describing composite-coating selections of the invention for increasing durability of market-usage product.

DETAILED DESCRIPTION

Figure 1:
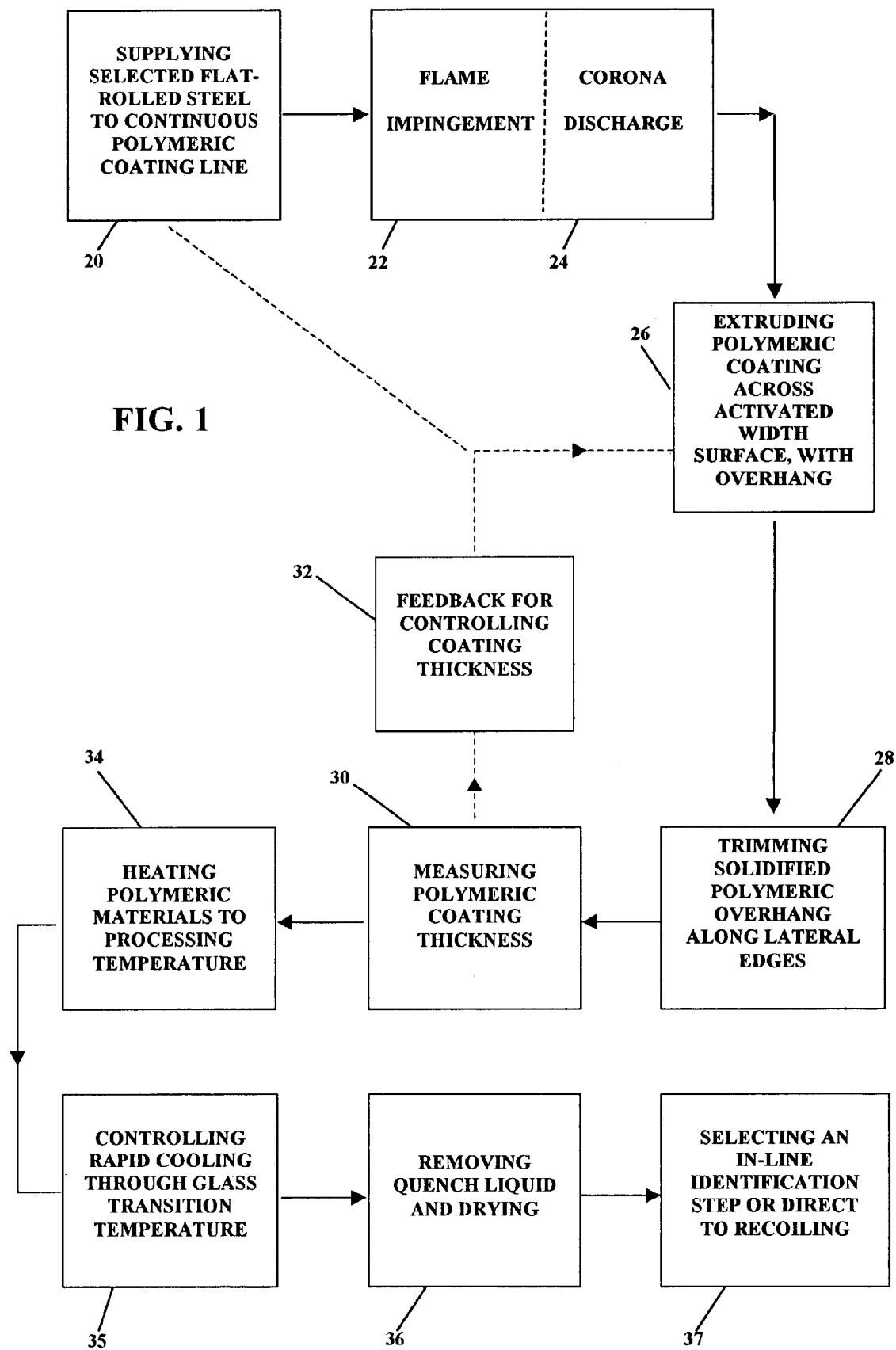
FIG. 1 is a diagrammatic flow chart for describing processing of the invention for selective single surface and dual-surface polymeric coating embodiments of continuous-line operations.

Referring to FIG. 1, supply of continuous-strip corrosion-protected flat-rolled steel is controlled at station 20 for surface pre-treatment steps. A single surface is pre-treated at-a-time for activation of that surface for enhancing adhesion of a selected thermoplastic polymeric material of the invention. Surface pre-treatment flame impingement is carried out at station 22; ionization of gas contiguous to that surface, preferably by corona-discharge, can be carried out at station 24 of FIG. 1; and, pre-treatment flame-impingement and surface-gas ionization steps can be combined.

Flame impingement is a preferred initial pre-treatment step. Coiling-lube solution as used by some flat-rolled steel mills is burned-off, along with associated debris, by an initial flame impingement. One or more rows of burners, of the type shown schematically in cross-section FIG. 2, are utilized on the surface being prepared dependent on line speed; and, those burner rows extend across full surface width of the strip. It is estimated that restricting oxygen content of the impinging flame produces a surface-reaction causing loss of surface electrons; enabling valence bonding, which could help to explain the resulting strong adhesion achieved between an organic coating and an inorganic metallic surface.

Preferably, that single substrate surface is also pre-treated to further activate, or maintain activation of that surface during strip travel, by ionizing gas contiguous to that surface, for example, by utilizing one or more corona discharge electrodes, shown schematically in FIG. 2, which extend in functional relationship across strip width. A combination of those pre-treatments is preferred so as to establish a surface for aggressively bonding with an anhydride-modified polymeric coating material, which, in accordance with the invention, first contacts that surface. If flat-rolled steel, as supplied for a single-surface coating embodiment includes coiling solution, sufficient flame impingement can be used on that remaining surface for burn-off of that solution, as indicated by the single burner, shown in interrupted lines, in FIG. 2.

To enhance polymeric coating adhesion, facilitate fabrication, and provide durability for market-usage products, the invention teaches utilization of flat-rolled steel surfaces substantially free of mill scale. A metallic corrosion-protective coating is selected, which requires removal of mill scale for application and, as applied, prevents iron-oxide formation on the substrate surface. That metallic coating is also selected to be capable of responding to the described surface pre-treatment for enhancing bonding of a selected polymeric coating material of the invention. Metallic corrosion protection can be carried out by electrolytic plating, hot-dip molten metal coating, or conversion-coating of the flat-rolled steel substrate surface, for example, by using a dichromate. That oxide-free metallic corrosion-protected sub-surface, in combination with activation for adhesion of a combination of selected polymeric coating materials, produces engineered composite-coated work-product for increasing fabricating opportunities for, and durability of, market fabricated product.

Referring to FIG. 1, subsequent to pre-treatment of a single-surface, multiple selected polymeric coating materials, as heated and pressurized, are extruded at station 26; as adherent molten film layers extending across strip width and, purposefully, extending so as to establish polymeric overhang along each elongated lateral edge of the strip. Utilizing that polymeric overhang enables achieving uniform polymeric coating thickness across strip width, as described in more detail in relation to later FIGS.

With solidification of the polymeric coating materials, polymeric overhang is removed, along each lateral edge, at station 28 of FIG. 1. Removal of polymeric overhang is carried-out prior to measuring polymeric coating thickness at station 30. That thickness measurement enables signal feedback at station 32 for controlling polymeric coating thickness on a continuing basis. Coating thickness correction, as utilized for achieving substantially uniform coating thickness, can be directed to polymeric coating station 26 which can provide quantitative control of extrusion; and/or can be directed to station 20 for line-speed control.

After edge trimming at station 28 and steps associated with measuring polymeric coating thickness at station 30, the single-surface polymeric-coated strip is directed for finishing-processing of the invention. Finishing processing is initiated at station 34 of FIG. 1, by heating the polymeric coating materials to a temperature exhibiting melt characteristics. That step, along with a selected brief interval of in-line travel, in that heated condition prior to cooling, helps to augment polymeric adhesion by filling and covering the topography of a surface, which can be finely-pitted due to mill-scale removal prior to metallic-protective coating. That re-melting during finish-processing can add a mechanical adhesion factor, augmenting chemical bonding with the substrate surface; and, that re-melting also augments the bonding between the selected polymeric coating layers of the invention.

The polymeric coating material is then rapidly cooled through glass transition temperature at station 35 of FIG. 1 which contributes significant advantages to the polymeric-coating. The thermoplastic polymeric materials, selected as part of the invention, exhibit high strength characteristics, however, they can also tend to exhibit crystalline characteristics. Heating to a temperature range providing melt characteristics for the polymeric materials, followed by rapid cooling through glass transition temperature, establishes amorphous characteristics throughout the polymeric coating thickness; so as to substantially eliminate ultra-fine micro-fracturing of the polymeric coating, which could otherwise occur during fabrication of the work-product.

A controlled quench bath, as shown in later FIGS, is utilized for rapid cooling; the strip is then directed for removal of quench liquid and drying at station 36 of FIG. 1. The polymeric coated strip can then be directed to station 37 for optionally selecting an in-line work-product identification step or direct recoiling.

FIG. 2 presents a cross-sectional view, in a vertical plane perpendicular to the strip along the central axis of travel, of pre-treatment. The number of open-flame impingement burner rows of station 39, extending across strip width, can be selected depending on line speed and conditions at the strip surface. A single-surface is pre-treated at-a-time in order to augment polymeric adhesion. However, when pre-treating strip for solely single-surface polymeric coated, minimal opposite-surface burner exposure can be utilized, as needed, for removing residual coiling lube solution from that surface. It should be noted that continuous-strip, protected as taught herein, substantially eliminates any future requirement to use lubricating solution for recoiling purposes.

A selected number of in-line rows of electrodes, or preferably, corona-discharge units, as indicated in station 40 of FIG. 2, also extend across full-surface width for maintaining, and/or enhancing, surface activation. Corona discharge safely ionizes gases contiguous to the strip substrate surface, and electrical energy level per square foot of surface area is selected to avoid electric arcing. The gas ionizing means and their energy level are selected based on strip width and line speed in the continuous-line operations of the invention.

Referring to the schematic cross-sectional view of FIG. 3, a plurality of thermoplastic polymers, as selected, are combined and prepared to enable extrusion as multiple molten thin-film adherent layers. The polymeric coating materials include anhydride-modified polypropylene, and a combination of thermoplastic polymers which contribute coating characteristics facilitating fabrication and enhancing performance of market-usage products. A preferred embodiment combines, in addition to an anhydride-modified polypropylene film layer which first contacts the pre-treated surface, one or more layers which combine polypropylene with specified percentage, by weight, of polybutylene; the latter for adding polymeric strength and providing surface flexibility during fabrication of market-product.

Referring to a lower-located strip-entry portion of FIG. 3, continuous-strip 42 is introduced for polymer coating, free of heating requirements for the strip; which, in itself, facilitates continuous-line operations, by diminishing complications. A single pre-treated surface is presented for polymeric deposition. At the upper-located polymer supply portion of the apparatus of FIG. 3, provisions are shown for supplying up to three pre-selected thermoplastic polymeric materials. Solid pellets of a desired polymeric combination are supplied to respective hoppers 44, 45, and 46. Each hopper leads to its respective individually-heated connector structure 50, 51, and 52. Heaters, such as 53, are located along the length of each said tubular connector structure; and, an insulating housing, such as 54, can surround each tubular connector structure for helping to maintain melt temperature characteristics for each respective polymeric material. Pressurized movement of each polymeric material also tends to maintain a temperature sustaining melt characteristics; pressurizing can be achieved by driven internally-mounted augers (not shown) within each tubular connector for its respective polymeric material.

Each heated and pressurized polymeric material moves through respective transfer means 55, 56 and 57 located within heated block 58. Each said transfer means initiates molding a rectangular cross-section configuration for its respective polymeric material; the thickness of that configuration is decreased as its cross-strip related width increases during continued movement toward strip coating. Each said cross-sectional configuration polymeric material is quantitatively controlled and directed to a single die 60; in which molten extrusion temperature is maintained by heated block 62.

Extrusion die 60 of FIG. 3 acts as a final-die presenting an outlet configuration shaping the multiple polymeric materials into distinct thin-film adherent layers which provide substantially the intended total polymeric coating thickness, as pre-selected. Die 60 extends across strip width; and, also, purposefully extends beyond each elongated lateral edge of the strip for forming polymeric overhang which, after solidification, is trimmed from each lateral edge, helping to provide for uniform polymeric coating thickness across strip width. The distinct adherent polymeric layers are extruded substantially-simultaneously for travel associated with a single pre-treated surface of strip 42.

Referring to FIG. 3A, which is an expanded cross-sectional view of a designated portion of FIG. 3, deposition of selected molten thermoplastic polymeric materials, which are extruded as adherent thin-film layers by die 60 and are directed into a coating nip defined between pressure roll 64 and temperature-modulating roll 66 for travel with a single activated surface of strip 42. Pressure roll 64, preferably made of Teflon®-coated neoprene, exerts nominal pressure on the extruded polymeric materials so as to implement contact for travel with the strip on the periphery of temperature-modulated roll 66. The length of travel on the circumferential surface of roll 66 is selected, and, the peripheral surface temperature of roll 66 is controlled, from its interior, so as to facilitate initial solidification of the composite polymeric coating materials on roll 66 for continued travel in-line on the pre-treated substrate surface.

The molten polymeric layers are solidified as heat moves into the ambient temperature strip; however, solidification, during travel at line-speeds which can exceed six hundred feet per minute (fmp), takes place predominantly due to movement of heat into the controlled-temperature peripheral surface of temperature-modulating roll 66. That surface is held at about one fifty to about one seventy five degrees Fahrenheit (150° to 175°); which is significantly below melt film temperature used in continuous operations; the melt temperature for the thermoplastic polymers can approach three hundred fifty degrees Fahrenheit; however, film temperature, as extruded can exceed five hundred fifty degrees Fahrenheit. The solidified polymeric materials travel around contact roll 67, and coated strip 68 exits traveling in the direction indicated in FIGS. 3 and 3A.

In handling and combining the above-described thermoplastic polymers, the anhydride-modified polypropylene layer is extruded so as to first contact the pre-treated substrate surface. The level of anhydride in that combination is prescribed for supply; and, is selected for initial adherence based on factors such as line speed, bonding with an activated metallic substrate surface, bonding with adherent polymeric layer, so as to enable solidification during travel in continuous-line operations, as described.

In a specific embodiment of the first contacting layer, and of subsequent polymeric materials, polypropylene is selected for melt strength, which contributes to enabling initial wet-travel of the polymeric materials during a strip travel rate which is made practical by utilization of in-line melted extrusion deposition as shown in FIG. 3A. The anhydride-modified polypropylene layer first contacts the activated surface, an intermediate "bulk" layer containing polypropylene and about fifteen to twenty five percent, by weight, polybutylene can be used; and, a combination of polypropylene, with about five to ten percent, by weight, polybutylene, is selected for the outer surface layer, in a two or three layer embodiment. The polybutylene helps to substantially eliminate ultra-fine micro-fractures, referred to as "crazing", within the polymers which causes a frosty appearance. Eliminating crazing enhances fabricating capabilities for market-usage products. Desired colorants can be added in the polybutylene/polypropylene layers; also, lubricants can be added which are activated during fabrication of market products.

Adherence to the single pre-treated surface for travel, and polymeric solidification facilitate edge removing trimming of polymeric overhang from each lateral edge of single-surface coated strip 68. Forming lateral edge overhang at each lateral edge, solidifying, and removing that overhang provide an important solution to an encountered problem. It was found that extruding thin-film polymeric coating across the flat-rolled strip width, to its lateral edges, prevented achieving uniform coating thickness; that is, extruding thin-film polymeric coating materials extending to each lateral edge, of ambient temperature continuous-strip, caused edge build-up. Extruding thin-film layers from a width-wise elongated narrow-opening die, resulted in a semi-spherical shape where extrusion stops due to cohesive necking-in at such a location. By extruding to each lateral edge, that spherical build-up increased the thickness of the polymeric materials contiguous to each lateral edge of the strip; which, in turn, prevented an intended uniform polymeric thickness across full strip width. Also, that edge build-up had other disadvantages, for example, in later re-coiling, and, potentially, during fabrication of market-usage product.

To eliminate that edge build-up problem and associated disadvantages, the die outlet configuration for the extrusion die is constructed to extend across full strip width and, in addition, to extend beyond each lateral edge of the strip so as to provide a polymeric overhang at each lateral edge. After in-line solidification, as described above, that polymeric overhang, which includes said thickened lateral-edge portion, is removed at edge trimming station 70 of FIG. 3. That enables continuing accurate measurements of polymeric thickness across full strip width as shown in later FIGS.; and, enables maintaining substantially-uniform coating thickness across full strip width during continuous-line operations.

Figure 4:
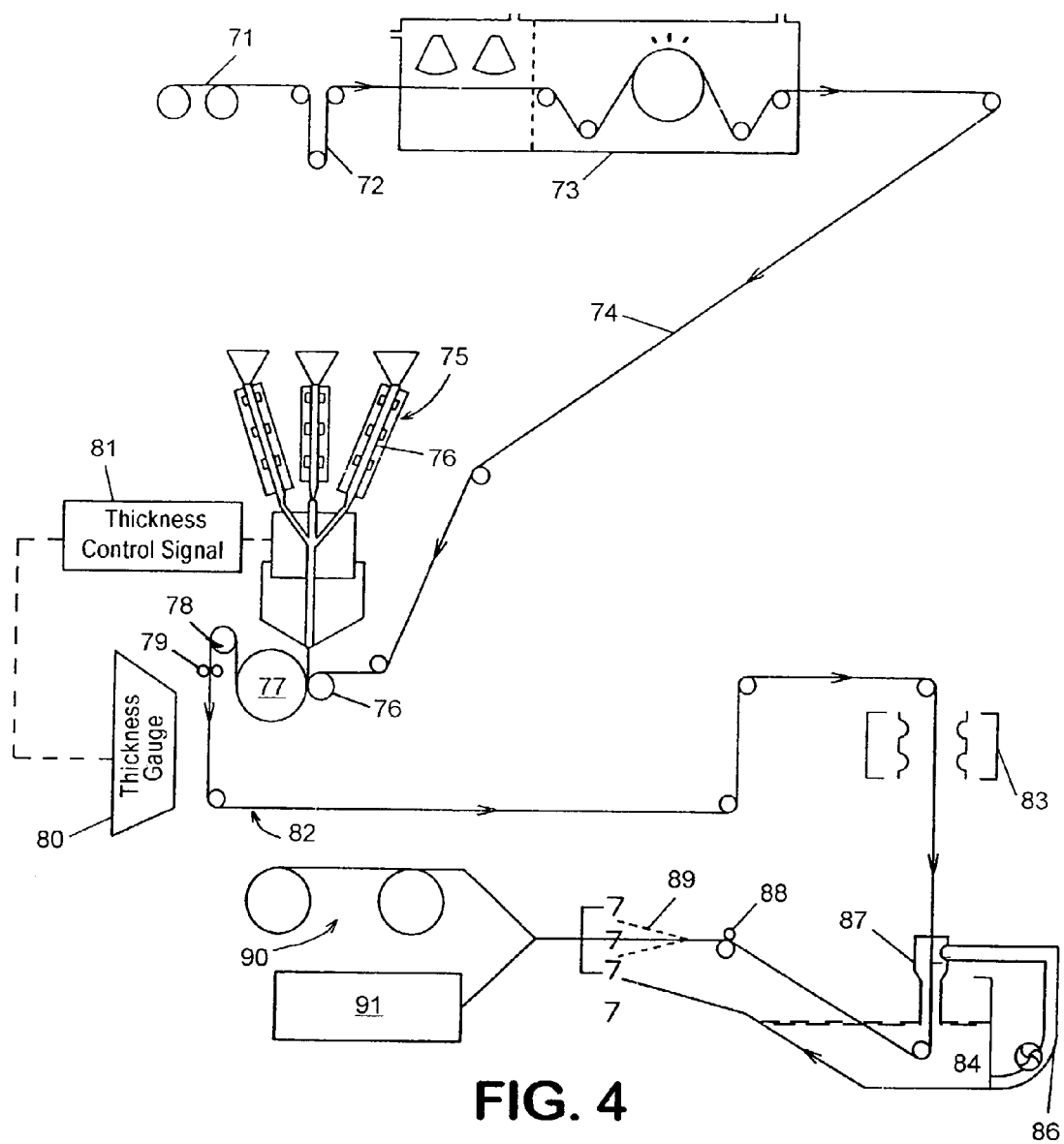
FIG. 4 is a schematic perspective view, partially in cross-section, for describing continuous-line apparatus for surface activation and melted polymer extrusion in a single-surface polymeric-coating embodiment of the invention, including finish-processing of that surface.

The apparatus of the embodiment of FIG. 4 is located to provide for continuous-line production of polymeric coating solely on a single surface of metallic substrate. Continuous-strip 71 is directed through looping tower 72 and into surface pre-treatment station 73 for selective surface pre-treatments, as described above in relation to FIG. 2. Travel of strip 74, with an activated surface, is directed toward thermoplastic polymer supply apparatus 75 for polymeric coating materials, which are heated, pressurized, and shaped for extrusion, as described in relation to FIGS. 3 and 3A.

In FIG. 4, strip 74 travels into a coating nip defined by pressure roll 76 and temperature modulating roll 77. Polymeric coating materials, as supplied and prepared in apparatus 75, are extruded as thin-film adherent layers into that coating nip; and, solidified during travel around temperature-modulating roll 77. The extruded polymeric coating extends across full strip width; and, in addition, extends beyond each lateral edge to form a polymeric overhang.

Solidification of the selected polymeric coating materials is initiated at temperatures below about three hundred thirty five to about three hundred fifty degrees Fahrenheit. Travel of the polymeric layers on the circumferential surface of temperature-modulating roll 77, which is held at about one hundred fifty to about one hundred seventy degrees Fahrenheit, facilitates solidification of the polymeric materials. The single-surface coated steel substrate travels around roll 78 to trim station 79, for removal of solidified polymeric overhang from each longitudinally-extended lateral edge of the strip.

The thickness of the single polymeric coated surface is measured across strip width at thickness gauge 80 and thickness signals, as generated, are transmitted to thickness control unit 81 for in-line control and maintenance of desired coating thickness. That thickness control can be exercised by selecting from the group consisting of controlling pressure within extrusion apparatus 75, controlling line speed, controlling die opening, and a combination of those. Coating thickness at incrementally spaced locations across strip width can be controlled by controlling the configuration of the die opening, along its width-wise opening, at incrementally selected locations correlated with incremental measurement locations across strip width.

Edge-trimmed single-surface polymeric coated strip 82 of FIG. 4 travels in-line toward finish-processing. Finish-processing is initiated at heating apparatus 83. High-frequency induction heating rapidly heats the fast-moving steel substrate which transfers heat to the polymeric coating. However, surface-penetrating infra-red radiation heating of the polymeric materials can be combined in an effort to provide for uniform heating throughout the polymeric coating; which helps to avoid undue residual heat existing in the steel strip.

Finish-processing heating is selected to provide melt temperature characteristics for the selected polymeric materials; and provision is made for in-line travel time of the coated polymers and strip in that heated condition; that can help to achieve full contact of the polymeric coating with what may be a finely pitted topography of the metallic substrate surface; which can add a mechanical type of adhesion to the polymeric chemical bonding with that surface.

An important part of finish-processing is rapidly cooling the heated thermoplastic polymeric coating materials through glass transition temperature. That rapid cooling from melt temperature through glass transition temperature substantially eliminates crystalline characteristics in the polymers; and, fixedly establishes desired amorphous characteristics throughout the polymeric coating thickness. Application of quench bath 84 of FIG. 4 is selected to also remove residual heat from the flat-rolled steel strip so as to avoid any reheating of the thermopolymers above glass transition temperature.

To augment rapid cooling, when needed, coolant from bath 84 can be pumped through re-circulating line 86 for laminar-flow of through-entry structure 87. A separate heat exchange means for removing heat from the re-circulating coolant can also be used as needed dependent on line speed, polymeric thickness, and steel thickness gauge; that is, a closed-loop refrigerant-type liquid in thermal heat exchange with the recirculating quench liquid which can be deionized water or tap water, helps to more readily maintain desired coolant temperature for rapid cooling through glass transition temperatures. Bath agitation, due to the selected line speed, or use of quench bath baffles, can help to prevent formation of thermal barriers which could inhibit a desired rate of cooling for establishing the desired amorphous characteristics throughout the polymeric-coating materials. In FIG. 4, quench liquid drag-out by the strip is returned by wiper rolls 88, the coated strip is dried at station 89; and, directed for selective recoiling at 90 or identification for fabricating at station 91.

Figure 5:
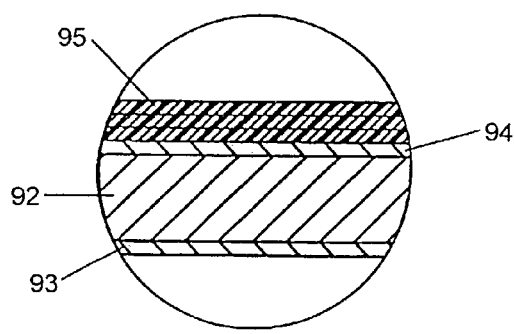
FIG. 5 is an enlarged cross-sectional view for describing metallic corrosion production of flat-rolled steel in accordance with the invention and single-surface polymeric coating, as produced by utilizing the continuous-line embodiment of FIG. 4.

FIG. 5 is an enlarged cross-sectional view of engineered composite-coated work product, with polymeric coating on a single surface, produced using the single-surface embodiment of FIG. 4. Steel substrate 92 includes metallic corrosion-preventing coating on each substrate surface, respectively 93, 94. Polymeric coating 95 includes multiple distinct polymeric layers on a single substrate surface. Metallic corrosion-prevention coating thickness and polymeric composite coating thickness are selected so as to contribute to particular market-usage for single-surface polymeric-coated work-product for such use of polymeric coated flat-rolled steel in construction, as two-by-fours, beams, columns, rafter supports, and other building structure units, particularly for interior usage; along with other uses in transportation products.

The continuous-line operations of the invention also facilitates dual-surface polymeric coating. In a dual-surface coating embodiment, a single surface is pre-treated at-a-time; that single surface activation is promptly followed by polymeric coating, solidification, edge-trimming and thickness gauging. And, after carrying-out those coating production steps separately for each surface, finishing processing of both surfaces is carried out simultaneously.

Figure 6:
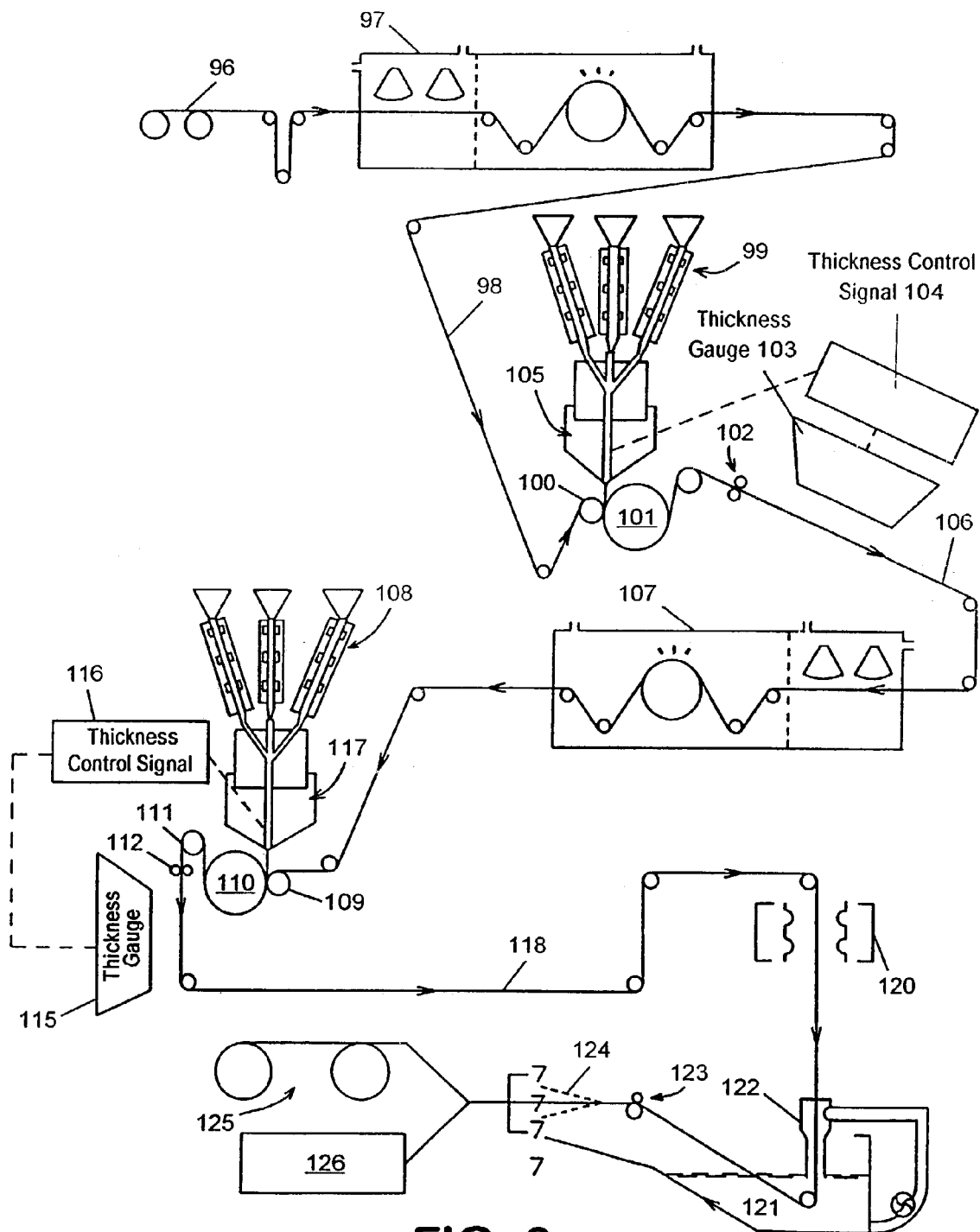
FIG. 6 is a schematic view, partially in cross-section, of dual-surface polymeric-coating continuous-line apparatus of the invention, for describing separately pre-treating and polymeric coating a single surface at-a-time of rigid flat-rolled steel substrate continuous-strip, including simultaneous finish-processing of both surfaces.

Referring to FIG. 6, strip 96 is directed through a looping pit into single-surface pre-treatment station 97. A single surface is pre-treated by selective combination of flame-impingement and ionizing gas contiguous to that surface, for surface activation, as described in relation to FIG. 2. Single-surface pre-treated strip 98 is directed in-line for initial polymeric coating of that single surface. Multiple polymeric coating materials are supplied to, heated and pressurized within apparatus 99, for adherent molten thin-film extrusion, as-described in relation to FIG. 3. Pressure roll 100 and temperature-modulation roll 101 define a coating nip, for initiating polymeric coating multiple adherent thin-film layers on that single pre-treated surface; as described in relation to FIG. 3A.

Solidification of those polymeric coating materials is achieved during circumferential travel on the peripheral surface of temperature-modulating roll 101; that peripheral surface is cooled as necessary from internally of roll 101. The solidified single-surface coated strip, travels as previously described, to trim station 102, for removal of solidified polymeric overhang from each longitudinally-extending lateral edge of the strip; and then to thickness measurement.

That polymeric coated single-surface confronts thickness gauge 103 at which thickness measurements can be carried-out at incrementally-spaced locations extending across strip-width for that said single-surface. Thickness measurement signals from gauge 103 are transmitted, as indicated, to feedback unit 104 for direction to selected thickness-control means. Thickness control signals are preferably transmitted, as shown in FIG. 6, to extrusion die structure 105 for maintaining quantitative control of desired polymeric coating thickness, on a continuing basis, across that single coated surface. Such control can extend to adjustments at incrementally-spaced locations along the elongated extrusion die which widthwise of the strip.

Edge-trimmed, single-surface coated strip 106 is directed in the continuous-line so as to present its non-polymeric coated surface for activation of that remaining surface at pre-treatment station 107, surface activation is carried out as described in relation to FIG. 2. After pre-treatment activation of the single remaining surface, the strip is guided, within the continuous-line as shown, for polymeric coating of that surface. A combination of polymeric coating materials, as supplied to and prepared for extrusion as adherent thin-film layers by apparatus 108; as previously described in relation to FIG. 3. Pressure roll 109 and temperature-modulation roll 110 form a coating nip, initial deposition and solidification are carried out as described in relation to the enlarged view of corresponding rolls in FIG. 3A.

Strip, with solidified polymeric coating on that remaining surface, travels around roll 111; and, is directed to edge trim station 112 for removal of polymeric overhang along each longitudinally-extending lateral edge. The strip is then guided in-line in relation to present that separately said recently-coated surface for polymeric thickness measuring at gauge 115. Thickness measurements are directed to feedback control unit 116; signals are preferably directed to extrusion control apparatus 117 for maintaining desired substantially-uniform coating thickness across said remaining surface of strip 118, as previously described.

The dual-surface polymeric coated strip 118 travels in-line for finish-processing which is carried-out simultaneously on each surface of the dual-surface polymeric-coated work-product. Finish-processing includes heating polymeric coatings to achieve melt temperature characteristics for the polymeric coating materials. Heating station 120 can provide for selective use of high-frequency induction for quickly heating the strip; and, penetrating infra-red radiation may be used for helping to produce uniform melt characteristics throughout the combined polymeric coating materials. In-line travel time in that heated condition helps to complete contact with and covering the entire topography of the metallic surface, as previously described, before entry into quench bath 121.

The temperature for establishing melt characteristics, and time at that temperature during a brief travel interval, before entry into the quench bath, augments surface bonding and prepares for establishing amorphous characteristics, free of crystalline characteristics, by the rapid-cooling in quench bath 121.

Rapidly cooling through glass-transition temperature in quench bath 121 of FIG. 6 functions to fix desired amorphous characteristics in the polymeric coating; and, to provide a smooth exterior surface which facilitates later fabrication. That rapid cooling can be augmented using a laminar-flow injection for recirculating coolant at entrance 122 of FIG. 6. Maintaining a desired cooling temperature for the quench bath can be augmented using a pump-activated recirculating line; and, that cooling can be supplemented by closed-loop refrigerant-type cooling of the quench liquid, as previously described.

The line speeds available can also help to provide sufficient turbulence within the quench tank so as to help prevent forming of thermal barriers which also help to achieve rapid cooling uniformly on both coated strip surfaces. Wringer-rolls 123 return strip drag-out of quench bath liquid; and, blower apparatus 124 dries the coated strip which is directed to recoiling station 125 or to station 126 for identifying for fabrication.

The above-described continuous-line embodiments which prepare a single surface at-a-time for polymeric coating, contribute to production efficiencies enabling line speeds which can extend from about six hundred to about fifteen hundred feet per minute, for both single surface and dual-surface embodiments. In the dual-surface embodiment of FIG. 6, finishing-processing by heating of polymeric-coatings on opposed surfaces simultaneously; and, rapid cooling of polymeric materials on both surfaces simultaneously through glass transition temperature, contribute additionally to uniformity of polymeric coating characteristics on both surfaces.

A dual-surface polymeric material coated work-product embodiment is shown in the expanded cross-sectional view of FIG. 7. Continuous-strip steel is represented at 126; metallic corrosion-protective coating is represented at 127 and 128; and, polymeric coating, comprising distinct layers, is represented at 129 and 130, in the expanded cross-sectional view of FIG. 7.

In fabricating market-usage products, for example for canning comestibles, a metallic corrosion protective coating (127, 128 of FIG. 7) is preferably selected from cathodic dichromate, electrolytic chrome/chrome oxide plating and electrolytic tinplating. The continuous-strip steel (126 in FIG. 7) is selected for desired tensile strength with base weight from about forty-five to about one hundred thirty five pounds per base box ("base box" is defined as area of 31,360 square inches); those base weights represents a thickness range of about five mils (0.005") to about fifteen mils (0.015"); and, tensile strength of about forty to fifty thousand pounds per square inch of single-reduced plate (referred to as SR 4,5).

However, the glass-like polymeric surface properties, the surface strength and adhesion of polymeric materials of the present invention, have been found to enable use of higher-tensile strength, lighter-weight, double-reduced steel. That increased tensile strength flat-rolled steel is produced by a double cold reduction, in which the second cold reduction is carried out free of an intermediate anneal. Double-reduction of flat-rolled steel provides a tensile strength of eighty to ninety thousand pounds per square inch (referred to as DR 8,9), and can be used with present teachings at thicknesses of about four mils (0.004") to about seven mils (0.007") for can bodies, easy-open end-closures, and other can parts.

Can products, other than three-piece cans, which require significant fabrication, for example, one-piece can bodies where height exceeds diameter, have been largely dependent on use of single-reduced electrolytic tinplated steel. Use of a chrome oxide coating had been substantially limited to three-piece cans fabricated with welded side-seams and to flat end closure structures, other than safety-edge easy-open end closures. One concern was abrasive-wearing of one-piece can body tooling, during fabrication, due to the abrasive characteristics of chrome oxide.

The present coating methods and products provide for one-piece can body fabricating capabilities which can include double-reduced can stock, with corrosion-protection using cathodic dichromate, electrolytically plated chrome/chrome oxide, or electrolytically plated tin. The smooth surface, high-strength, adherent polymeric coating of those composite-coated work products enable market-usage fabrication of one-piece can bodies in a range of diameters, from about 2$\frac{2}{16}$", (202) to about 3$\frac{7}{16}$" (307), with side wall height from about 2$\frac{2}{16}$" (206) to about 4$\frac{13}{16}$" (413); such as:

| Diameter–Height | Use |
|---|---|
| 202–314 | for example for tuna cans, |
| 307–317 | for example for soup cans, and |
| 211–413 | for twelve ounce tomato juice or carbonated beverage cans. |

And, in addition, because of contributions of the polymeric coating methods and finish-processing of work-product, such one-piece can bodies can be draw-processed free of spraying with liquid sheet-metal draw lubricants; for example, the disclosed polymeric material surface layer enables incorporating a lubricating compound which is activated during fabrication.

Chrome/chrome oxide corrosion-protection coating can be selected in a range of:

3 to 13 mg. per square foot chrome, and 0.7 to 2.5 mg. per square foot chrome oxide.

Electrolytic tinplating for use with the polymeric coatings of present teachings, can be in the range of:

from 0.05 pound per base box, to about 1.35 pounds per base box on each surface; or, with differential coatings per surface, within such range.

Cathodic dichromate conversion coatings can be coated by immersion or can be electrolytically applied, from about one hundred fifty (plus or minus 100) to about six hundred fifty (plus or minus one hundred) micrograms per square foot.

FIG. 8 schematically presents a perspective view of a portion of an elongated market-usage product 140, for representing types of structures, fabricated from flat-rolled steel, which are used in building construction; such as: flat-rolled steel substrate beams, columns, two-by-fours, duct-work, or panel members used for fabricating building units for interior and exterior usage; such as: doors, door and window framing, interior or exterior decorative moldings, dormer sheathing, roofing, and roof-ridge structures; and, for fabricating transportation-vehicle panels and structural units.

FIG. 9 is a detailed cross-sectional view representative of angled fabrication, such as a corner portion formed from a composite-coated flat-rolled steel in fabricating end-usage product 140. Steel substrate 142 can be selected as SR 4,5 within a thickness range of about five and one half to about fifteen and one half mils (0.0055" to 0.0155"). A metallic corrosion-protective coat, to prevent iron oxide formation, can be selected from any of the previously listed metallic coating; but, preferably, consists of hot-dip zinc spelter layers 143, 144 respectively on each surface. The extruded polymeric coating 145, 146, respectively, on each surface, can comprise two or three of the distinct layers of polymeric materials as previously described; and, with polymeric coating thickness in the range of about one mil (0.001") to about two mils (0.002") per surface, which helps to deaden sound transmitting by, and resonance within, sheet-metal building units; those polymeric coatings also act as a thermal barrier to offset the effect of changes in temperature within a building, or offset the surface effect of a temperature-gradient between an interior and an exterior wall. A polymeric coating of up to about four mils (0.004") can be selected for use on weather-exposed exterior building structure surfaces for doors, for framing for doors or windows, for molding, and the like; while a thinner polymeric coating can be selected for an interior surface, or for the interior of a building.

A hot-dip zinc spelter coating for building structures can be selected in a range, from about 0.04 up to 1.25 ounces per square foot both surfaces; about two ounces per square foot, total zinc spelter both coated surfaces, can be used for heavy-duty outdoor structures. A differential zinc spelter coating can also be selected for each coated surface in the above ranges.

Continuous-strip width for polymeric coating deposition, in accordance with present teachings, is preferred in a range of about thirty six to about forty inches; the dimensional specifications for apparatus for surface pre-treatment, polymeric coating, and edge trimming can be specified based on the width of the strip.

Polymeric coating materials combinations can be ordered for preparation to specifications from: Basell Polyolefins USA Inc., 2801 Centreville Road, Wilmington, Del. 19808.

Dimensional specifications as set forth herein can be provided for ordering surface burners from: Flynn Burner Corp., New Rochelle, N.Y. 10802; for:

Corona discharge electrodes, to selected specifications can be provided by ordering from: Enercon Industries Corp., Menomonee Falls, Wis. 53502; for:

Polymeric extrusion apparatus to specifications, can be ordered from: Black Clawson Converting Machines, LLC., Fulton, N.Y. 13069, and Infra-red gauges for measuring polymeric coating thickness and feedback equipment can be ordered to specifications from: NDC Engineering, Irwindale, Calif. 91706.

While specific combinations of materials, dimensional values, method steps, apparatus and uses have been set forth for purposes of disclosing embodiments of the invention, it should be noted that in the light of those disclosures, others skilled in the art are in a position to use present teachings to devise combinations and use values differing from those specified for purposes of the above disclosure; but, which continue to rely on principles of the invention as above disclosed. Therefore, for purposes of interpreting the appended claims reference shall be made to the above disclosure, and the described functions of the invention, for evaluating the scope of patentability of subject matter as recited in the claims.

What is claimed is:

1. A polymeric coating process for producing composite-coated continuous-strip steel, comprising:

activating a first surface of a continuous-strip steel substrate;

presenting the activated first surface at ambient temperature for co-extrusion;

co-extruding a first coating on the activated first surface presented at ambient temperature, the first coating comprising a thermoplastic polymeric first contacting layer in contact with the activated first surface and a first bulk layer overlying the first contacting layer, the first contacting layer comprising anhydride-modified polypropylene, the first bulk layer comprising polypropylene and polybutylene; and solidifying the first coating.

2. The process of claim 1, further comprising:

melting the first contacting layer and the first bulk layer; and rapidly cooling the first contacting and bulk layers through glass transition temperatures of the thermoplastic polymers.

3. The process of claim 1, further comprising:
activating a second surface of the continuous-strip steel substrate;
presenting the activated second surface at ambient temperature for co-extrusion;
co-extruding a second coating on the activated second surface presented at ambient temperature, the second coating comprising a thermoplastic polymeric second contacting layer in contact with the activated second surface and a second bulk layer overlying the second contacting layer, the second contacting layer comprising anhydride-modified polypropylene, the second bulk layer comprising polypropylene and polybutylene; and
solidifying the second coating.

4. The process of claim 3, further comprising:
melting the first and second coatings; and
rapidly cooling the first and second coatings through glass transition temperatures of the thermoplastic polymers.

5. The process of claim 1, wherein the continuous-strip steel substrate has a thickness in a range of 5 mils to 15 mils.

6. A polymeric coating process for producing composite-coated continuous-strip steel, comprising:
activating a first surface of a continuous-strip steel substrate;
presenting the activated first surface at ambient temperature for co-extrusion;
co-extruding a first coating on the activated first surface presented at ambient temperature, the first coating comprising a thermoplastic polymeric first contacting layer in contact with the activated first surface, a first intermediate bulk layer overlying the first contacting layer, and a first outer surface layer overlying the first intermediate bulk layer, the first contacting layer comprising anhydride-modified polypropylene, the first intermediate bulk layer comprising polypropylene and polybutylene, the first outer surface layer comprising polypropylene and polybutylene; and
solidifying the first coating.

7. The process of claim 6, wherein the first intermediate bulk layer has a polybutylene content of 15 to 25 weight percent, and wherein the first outer surface layer has a polybutylene content of 5 to 10 weight percent.

8. The process of claim 6, further comprising:
melting the first contacting layer, the first intermediate bulk layer, and the first outer surface layer; and
rapidly cooling the first coating through glass transition temperatures of the thermoplastic polymers.

9. The process of claim 6, further comprising:
activating a second surface of the continuous-strip steel substrate;
presenting the activated second surface at ambient temperature for co-extrusion;
co-extruding a second coating on the activated second surface presented at ambient temperature, the second coating comprising a thermoplastic polymeric second contacting layer in contact with the activated second surface, a second intermediate bulk layer overlying the second contacting layer, and a second outer surface layer overlying the second intermediate bulk layer, the second contacting layer comprising anhydride-modified polypropylene, the second intermediate bulk layer comprising polypropylene and polybutylene, the second outer surface layer comprising polypropylene and polybutylene; and
solidifying the second coating.

10. The process of claim 9, wherein the first and second intermediate bulk layers each have a polybutylene content of 15 to 25 weight percent, and wherein the first and second outer surface layers each have a polybutylene content of 5 to 10 weight percent.

11. The process of claim 9, further comprising:
melting the first and second coatings; and
rapidly cooling the first and second coatings through glass transition temperatures of the thermoplastic polymers.

12. Polymeric coating process for producing composite-coated continuous-strip flat-rolled steel, comprising:
A) supplying continuous-strip flat-rolled steel substrate for continuous-line travel presenting opposed substantially-planar surfaces extending width-wise between longitudinally-extending lateral edges of said substrate;
B) pre-treating a single surface at-a-time of said substrate so as to activate said surface for polymeric adhesion;
C) delivering said substrate, at ambient temperature, presenting an activated surface for polymeric coating;
D) pre-heating and pressurizing multiple-selected thermoplastic polymeric materials for molten extrusion under pressure;
E) extruding said thermoplastic polymeric materials as adherent thin-film layers, and
F) depositing said adherent thin-film layers for travel in said continuous-line associated with a single activated surface, while providing for selecting from the group consisting of
  (i) depositing said adherent thin-film layers of polymeric coating materials for association solely with one said activated surface,
  (ii) depositing adherent thin-film layers of polymeric coating materials, separately on separately-activated opposed surfaces in said continuous-line, each for travel associated with its respective separately-activated opposed surface,
G) selecting said multiple thermoplastic polymeric materials for extruding as adherent thin-film layers, to include
  (i) an anhydride-modified polypropylene layer, and
  (ii) at least one layer combining polybutylene, in a selected percentage by weight range, with the balance polypropylene; while providing for
H) contacting said selected separately activated substrate surface first with said anhydride-modified polypropylene layer.

13. The process of claim 12, including
I) supplying said continuous-strip flat-rolled steel substrate, so as to be substantially-free of iron oxide, on said opposed surfaces, for coating with said polymeric materials, by
protecting said opposed planar surfaces against corrosion by selecting a metallic corrosion-protective coating from the group consisting of
  (i) cathodic-dichromate,
  (ii) electrolytic plating combining chrome and chrome oxide,
  (iii) electrolytic tinplating,
  (iv) electrolytic zinc plating, and
  (v) hot-dipped zinc-spelter coating.

14. The process of claim 13, in which said pre-treating, of a single surface substantially free of iron-oxide, is carried out by selection from the group consisting of:
  (i) impinging an open-flame,
  (ii) ionizing gaseous atmosphere contiguous to said single surface, and
  (iii) combinations of (i) and (ii), for depositing said adherent thin-film layers for travel with a separately-activated surface, as selected in Paragraph F above.

15. The process of claim 14, including providing for
J) extruding said thin-film polymeric materials
   a) extending across full surface width of said strip, and, in addition
   b) extending width-wise beyond each said longitudinally-extending lateral edge of said surface, resulting in
   c) forming a width-wise extending polymeric overhang along each said lateral edge of said strip;
K) solidifying said polymeric coating materials, including said polymeric overhang, while said strip is traveling in-line, then
   (i) trimming said solidified polymeric overhang from each said lateral edge of said strip, for
   (ii) facilitating achieving substantially-uniform polymeric coating thickness, associated with a single activated surface as selected above, between said lateral edges of said strip while traveling in-line.

16. The process of claim 15, in which
selecting said multiple polymeric materials, to include
   (a) an anhydride-modified polypropylene for first-contacting said activated surface;
   (b) an intermediate layer, combining polypropylene and polybutylene, in which polybutylene is selected in the range of about fifteen to about twenty-five percent by weight, and,
   (c) an outer surface layer combining polypropylene and polybutylene is which polybutylene is included in the range of five to ten percent by weight; and, in which
selecting said pre-treating steps, to include
   restricting oxygen-based content of said impinging open flame,
   (b) utilizing corona discharge, free of arcing, ionizing said gaseous atmosphere.

17. The process of claim 16, further including
L) measuring solidified polymeric coating thickness across strip width, by selecting from the group consisting of
   at least one location intermediate lateral edges of such strip, and
   a plurality of locations intermediate lateral edges of such strip.

18. The process of claim 17, including
M) responding to said thickness measuring for maintaining substantially-uniform polymeric thickness per activated surface, by selecting from the group consisting of
   (i) quantitatively adjusting pressurized feed of said molten extrusion,
   (ii) adjusting said nozzle opening; and,
   (iii) adjusting said line speed; and
N) selecting a polymeric thickness per activated surface in a thickness range of above about 0.2 mil to about 4.0 mils.

19. The process of claim 18, further including
O) finishing-processing of said polymeric coating materials, by
   (i) heating to within a temperature range for melting said adherent layers of polymeric materials,
   (ii) maintaining said heated condition for a selected interval of strip travel, for implementing polymeric material contact with, and covering of, surface topography, as presented by a selected activated surface, and
P) rapidly cooling said polymeric coating materials, through respective glass-transition temperatures, fixedly establishing substantially-uniform amorphous characteristics throughout said multiple layers of polymeric coating materials.

\* \* \* \* \*